Figure 1:
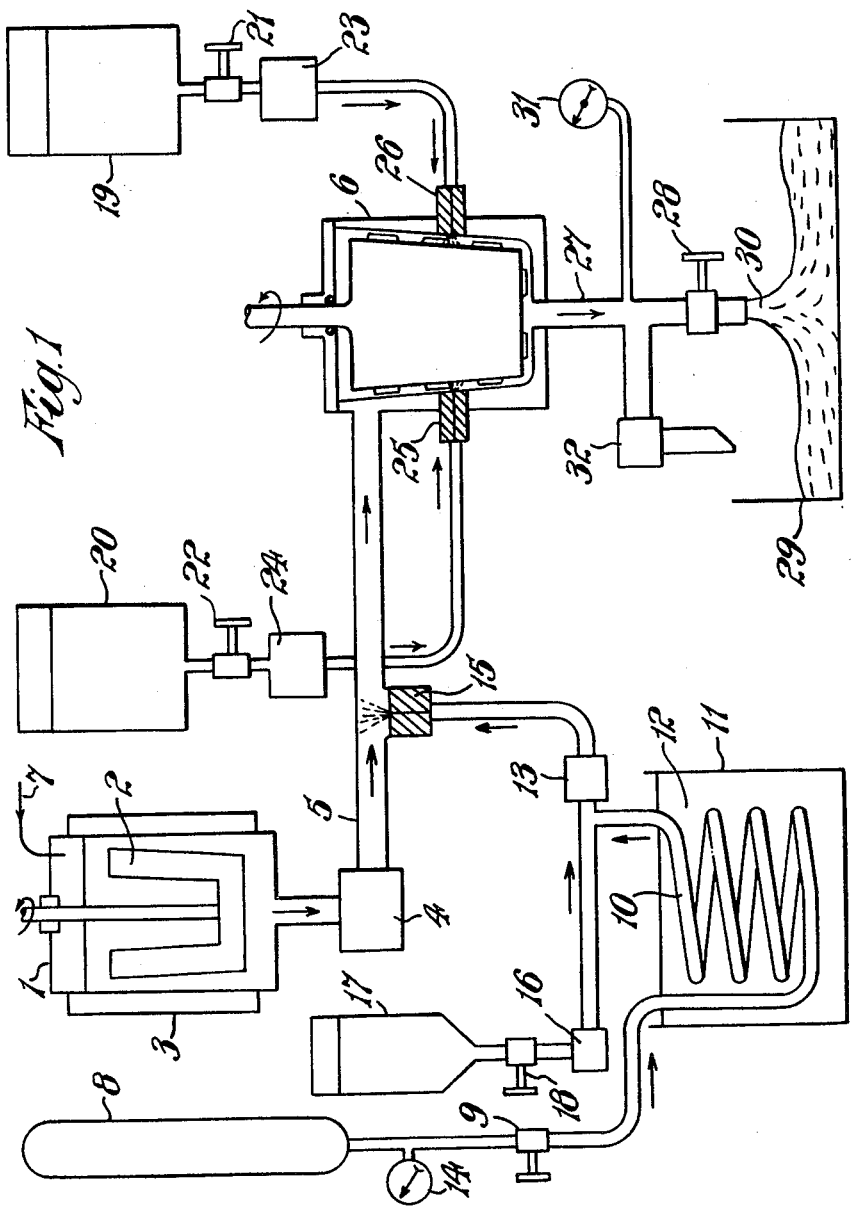

May 18, 1965 P. MERRIMAN 3,184,419
METHOD FOR THE PRODUCTION OF POLYURETHANE FOAMED MATERIAL
Filed Feb. 3, 1959 2 Sheets-Sheet 1

INVENTOR
Peter Merriman
by Benj. T. Rauber
his attorney

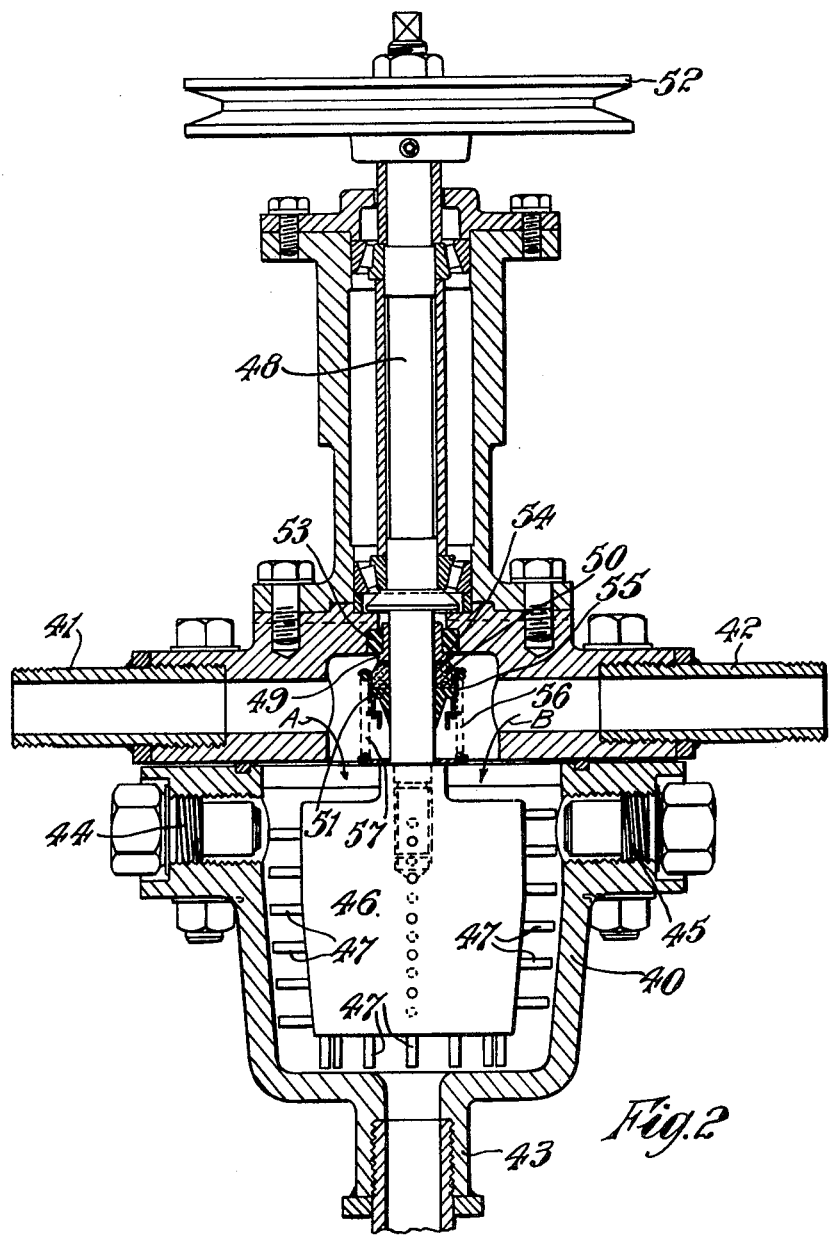

United States Patent Office 3,184,419
Patented May 18, 1965

---

3,184,419
METHOD FOR THE PRODUCTION OF POLY-URETHANE FOAMED MATERIAL
Peter Merriman, Edgbaston, Birmingham, England, assignor to Dunlop Rubber Company Limited, London County, England, a British company
Filed Feb. 3, 1959, Ser. No. 790,839
Claims priority, application Great Britain, Feb. 6, 1958, 3,837/58
7 Claims. (Cl. 260—2.5)

This invention relates to a method and apparatus for the production of polyurethane foamed material.

It is known that polyurethane foamed material can be prepared from liquid active-hydrogen containing polymers by modifying them with organic polyisocyanates or polyisothiocyanates and cross-linking the reaction product. When foamed material of this type are required in cellular form it is necessary to provide some means for foaming the liquid polymer prior to setting of the product. One method of doing this is to use water as the cross-linking agent and to provide sufficient of an organic isocyanate to react with the water to generate enough carbon dioxide to foam the mixture adequately. This method has the disadvantage that it requires relatively large amounts of polyisocyanates and also yields products that are undesirably stiff. An alternative procedure is to incorporate a gas into the liquid polymer under pressure and to foam the liquid by reducing the pressure but, although this method reduces the amount of polyisocyanate needed, special apparatus is required to agitate the polymer with the gas and simultaneously to remove the heat generated by the mechanical agitation and the absorption of the gas and such apparatus must be suitable for operation at very high pressures.

My invention provides a method for the production of polyurethane foamed material which requires only a simple form of apparatus which can be operated at relatively low pressures.

According to the present invention a continuous process for preparing cellular synthetic foamed material from a liquid composition containing a polymer and a compound capable of reacting therewith to form a polyurethane foamed material as a synthetic elastomer comprises incorporating a soluble inert gas under pressure in the liquefied state into the liquid composition at a temperature below that at which substantial reaction between the said polymer and the said compound takes place, foaming the liquid composition by reducing the pressure thereon and raising the temperature of the foam to convert the composition into an elastomer before substantial breakdown of the foam takes place.

The invention also includes apparatus for the continuous production of cellular polyurethane material which comprises a mixing chamber provided with an agitator, means for continuously supplying a liquid polymer under pressure to said mixing chamber, means for continuously injecting a liquefied soluble inert gas into the liquid polymer, means for continuously supplying a liquid capable of reacting with said polymer to the said mixing chamber under pressure and a valve adapted to control the discharge of the composition from the said mixing chamber.

Preferably, the liquefied gas is cooled to a temperature below its boiling point at the pressure subsisting thereon immediately prior to its incorporation in the liquid composition and it is also preferred to incorporate the liquefied gas in the polymer prior to addition of the compound capable of reacting therewith.

The method of the invention is especially suitable for the formation of polyurethane foams from polymers containing recurrent ether linkages in the molecule and possessing at least two chains with end groups having the formula —NCX, wherein X represents oxygen or sulphur. Typical polymers of this kind can be obtained by reacting a polymer diol with an amount of a polyisocyanate or polyisothiocyanate that is sufficient to extend the polyether chains by reaction with the hydroxy groups thereby providing linear molecules having isocyanate or isothiocyanate end groups. However, polymers which have been found to be particularly suitable for use in the invention are the polyalkylene ether polyols containing three or more chains, each containing a number of alkylene oxide units and terminating in isocyanate or isothiocyanate groups, e.g., branched chain polymers. An example of such a polymer is that made from a branched polypropylene ether polyol and an isocyanate. The polyol can be made, for example, by "growing" propylene oxide chains on to triethanolamine or tri-isopropanolamine so that each side chain contains from 8 to 24 propylene oxide units and terminates with a primary or secondary hydroxy group. Other branched chain polyols which can be used are those made by growing propylene oxide and/or ethylene oxide chains on to the nitrogen atoms of ethylene diamine, or on to the hydroxy groups of polyhydric alcohols such as glycerol or trimethylol propane, the said chains being so constituted as to terminate in hydroxy groups. The branched chain polymers can be used alone or mixed with straight chain polymers, for example the polypropylene ether diols. Generally speaking, the molecular weight of the polymer used in preparing the foam should be at least 1000 and preferably greater than 3000. The polyols used in preparing these polymers should also have a high molecular weight, for example at least 400, and may have molecular weights up to 3000 or more. By using various mixtures of the polymers the physical properties of the resultant foam can be varied accordingly.

The organic compounds containing the groups —NCX which can be used to prepare the polymer for use in this process are preferably the aromatic polyisocyanates or polyisothiocyanates, especially the diisocyanates, such as toluene diisocyanate and naphthalene diisocyanate, but other polyisocyanates or polyisothiocyanates can be used, for example the triisocyanates, such as triphenylmethane triisocyanate. Mixtures of these compounds can be used, a preferred mixture being one comprising approximately 80 percent by weight of 2:4-toluene diisocyanate and 20 percent of 2:6-toluene diisocyanate.

In a preferred method according to the invention the polymer used for making the foam, which will be referred to hereinafter as the "prepolymer," is prepared by reacting the polyols described above with the polyisocyanates or polyisothiocyanates to give a liquid polymer which is usually of a syrupy consistency. The amount of polyisocyanate or polyisothiocyanate used should be sufficient to bring about the desired chain extension reaction and to provide —NCX groups at the ends of the chains. For example, when using a polyisocyanate the amount is such that the final prepolymer has an —NCO titre of from 6 to 10. The titre can be determined by reacting a weighed amount of prepolymer with n-butylamine and back-titrating the uncombined amine with a standard hydrochloric acid solution. The polyol is preferably reacted at an elevated temperature, e.g., 70–100° C., and in the absence of oxygen, with a proportion of the isocyanate such that the —NCO titre is from 5 to 8 and the remainder of the isocyanate added after cooling the reaction product to 50° C. or below. The prepolymer is preferably allowed to mature for a period after it has been prepared; the period may be up to two days at room temperature or one day at 30° C. Generally speaking, the preferred prepolymers are those having a viscosity at 20° C. between 10,000 and 30,000 centipoises. The storage properties of the prepolymer can be improved by adding a suitable retarder at any convenient stage of its preparation. Typical retarders are acid halides such as benzoyl chloride, acid phosphates such as acid butyl phosphate and aromatic sulphenyl halides such as nitrobenzene sulphenyl chloride.

The compound capable of reacting with the prepolymer to form a synthetic elastomer can comprise any compound known to cross-link or otherwise solidify the liquid prepolymer to form an elastomer. Thus, in the case in which the polymer is a polyether containing isocyanate or isothiocyanate end groups the compound can be water or a polyol or other polyfunctional compound capable of reacting with the end group.

In preparing the cellular rubbers in accordance with the method of this invention an inert gas in the liquefied state is incorporated into the prepolymer, preferably before addition of the compound capable of reacting with the end groups thereof. The prepolymer can be used at about room temperature or can be cooled prior to injection of the gas.

By the term "inert gas" as used in this specification there is meant a gas which has no appreciable deleterious action on the components of the liquid polymer composition or on the final rubber. The inert gas used should be one which is soluble in the prepolymer to form a solution containing at least 4 percent by weight of gas when incorporated therein under the conditions of the invention. It can be incorporated by injecting it in liquid form through a suitable high pressure nozzle. The pressure at which the gas is incorporated in the prepolymer should be sufficiently high to prevent appreciable gasification therein but since the gas used is soluble in the prepolymer the pressure need only be of the order of that corresponding to the partial pressure of the dissolved gas and can therefore be considerably less than that on the liquefied gas immediately prior to injection.

In a preferred form of the invention the liquid gas is cooled before it is injected into the prepolymer since this facilitates pumping and metering of the liquid gas and also assists in cooling the prepolymer, thus increasing the amount of gas capable of dissolving therein. The amount of cooling required is usually from 15 to 30 degrees centigrade and the amount of gas incorporated in the prepolymer is from 1 percent to 6 percent by weight, for example about 4 percent. Unless the gas is cooled in this manner difficulty may be experienced in pumping and, consequently, in metering the gas while in some cases it may even be impossible to pump the liquefied gas without some degree of cooling.

A gas which is particularly suitable for carrying out the invention is carbon dioxide but other gases can be used, for example inorganic compounds such as sulphur dioxide and nitrous oxide and organic compounds such as the lower hydrocarbons and halogen substitution derivatives thereof, especially halogenated methanes. Suitable gases include ethane, propylene, propane, butane, methyl chloride, methyl fluoride, difluoro-chloromethane, dichlorofluoromethane, trifluoro-chloromethane, difluoro-dichloromethane, trifluoromethane and ethylene oxide.

After incorporation of the liquefied gas the prepolymer should be held at a low temperature while the cross-linking ingredients are added, such temperature being sufficiently low to prevent appreciable reaction between the prepolymer and the said ingredients. If the cooling effect of the liquefied gas is not sufficient to reduce the temperature to such value, the prepolymer can be cooled by separate means, preferably before incorporation of the gas. As the prepolymer is under the pressure of the dissolved gas the cross-linking ingredients must be forced into the prepolymer against this pressure and, in order to ensure a rapid and uniform dispersion thereof through the liquid, it is preferred to perform this operation by injecting them into the prepolymer in a mixing chamber fitted with an agitator, such as a stirrer.

The cross-linking ingredients react with the prepolymer when the temperature is increased and set the foam. It is generally preferred to add to the reaction mixture a catalyst or activator that catalyses the cross-linking reaction, for example a tertiary amine such as N-methyl morpholine or N.N-dimethyl benzylamine. Other catalysts can also be used. After the cross-linking ingredients and the catalyst (if used) have been thoroughly incorporated in the mixture the pressure thereon is reduced rapidly, preferably by discharging into a mould at atmospheric pressure through a suitable valve, and the dissolved gas is then given off rapidly converting the liquid prepolymer to a foam which fills the mould. The temperature of the material in the mould is allowed to rise, either by standing at room temperature or by warming the mould, and the prepolymer is simultaneously cross-linked, thereby setting the foam. The product is removed from the mould, preferably compressed by passing through rollers in order to burst any closed cells and is finally matured by storing either at room temperature or at an elevated temperature.

The invention will be clearly understood from the following description of an example of one form of apparatus and the method of operation for the production of cellular polyurethane rubber.

The example will be described with reference to the accompanying drawings wherein:

FIGURE 1 is a flow sheet illustrating diagrammatically the arrangement of the apparatus, and FIGURE 2 is a sectional elevation through the mixing chamber shown in FIGURE 1.

The apparatus

Referring to FIGURE 1, the apparatus includes a vessel 1 fitted with a slow stirrer 2 and a jacket 3 for refrigerating liquid. This vessel is provided for holding the stock of prepolymer and has a bottom outlet to a gear pump 4 arranged to pump the prepolymer along a conduit 5 connected with a top inlet of the mixing chamber 6. The vessel 1 is closed and has a top connection 7 to a source of dry gas such as air or nitrogen.

An inverted cylinder 8 containing liquid carbon dioxide is connected through a valve 9 to a coiled pipe 10 immersed in a vessel 11 through which refrigerent 12 can be passed and the outlet of the coil is connected to the inlet of a high pressure piston pump 13 of the fuel injection type having an adjustment for delivering accurately a predetermined amount of liquid on each stroke of the piston. A pressure gauge 14 is provided on the outlet of cylinder 8. The outlet of pump 13 is connected to an injection or atomising nozzle 15 inserted about half way along the conduit 5 connecting the gear pump 4 to the mixing chamber 6 and is arranged to inject liquid carbon dioxide into the polymer passing along conduit 5. A separate piston pump 16 is also arranged to draw a small proportion of a lubricant which does not freeze at the temperature of the liquid gas, such as castor oil, from a container 17 through valve 18 and to feed it to the inlet of injection pump 13 in order to lubricate the latter.

Two separate containers 19 and 20 for cross-linking solution and activator respectively are connected through valves 21 and 22 to two additional piston pumps 23 and 24 of the same type as pump 13 used for the liquefied gas and the outlets of these are arranged to feed the corresponding injection nozzles 25 and 26 in the mixing chamber.

The outlet 27 of the mixing chamber is connected to a manually operable valve 28 for controlling the pressure within the apparatus and arranged to discharge the liquid composition 30 into a suitable mould 29 placed beneath it.

The outlet 27 is also provided with a pressure gauge 31 and a safety valve 32 adapted to discharge the composition to the atmosphere if the pressure in the mixing chamber reaches excessive values. Alternatively, the safety valve can be arranged at the prepolymer inlet and arranged to return the prepolymer to the refrigerated storage vessel 1 thereby avoiding the risk of the valve becoming obstructed by cross-linked reaction mixture.

The mixing apparatus is shown in greater detail in Figure 2 of the drawing. Referring thereto, the mixing chamber 40 comprises an approximately cylindrical vessel the lower portion of which is of inverted frustoconical shape. The chamber is provided with two inlets 41 and 42 at the top, a bottom outlet 43 and two intermediate inlets 44 and 45, the last-mentioned inlets being in the form of injection nozzles. The stirrer is in the form of a drum 46 which fills a substantial portion of the vessel 40 and has a series of projections 47 arranged on its sides and on its lower surface, such projections extending to within a short distance of the inner walls of the vessel 40. The drum 46 is mounted on a spindle 48 passing through a pressure-tight seal 49, 50, 51 and driven by a pulley 52. The seal comprises a steel bush 49 set in a rubber mounting 53 and having a case-hardened bearing surface 54; the bush is a loose fit on shaft 48 and allows it to rotate freely. The rotary portion of the seal consists of a carbon ring 50 loosely mounted on shaft 48 and held in position by a tight-fitting rubber seal 51 which is itself held in collar 55 and urged against the stationary member by springs 56, 57. The arrows A and B show the direction of flow of the liquid materials into the chamber 40. When stirrer 46 is rotated at low speed projections 47 agitate the material in the vessel 40 at a relatively high rate.

*Preparation of prepolymer*

200 lbs. of polypropylene glycol of molecular weight 2,000 and water content less than 0.07 percent were introduced into a jacketted stainless steel vessel. The air in the space above the liquid was displaced by pure dry nitrogen and the glycol then heated to 80° C. with stirring. 10 lbs. of trimethylol propane were then melted and added, followed by 0.04 lb. of benzoyl chloride. 84 lbs. of toluene diisocyanate in the form of a mixture of 80 percent by weight of the 2,4 isomer and 20 percent of the 2,6 isomer were then added at a continuous rate of 31.5 lbs. per hour, stirring being continued at 80° C.±2° for the 160 minutes required. 1 lb. of silicone oil (polydimethyl siloxane) of 50 centistokes viscosity was then added and stirring continued for 20 minutes. The mixture was then cooled to 50° C. within the following 60 minutes.

A sample of the product was analysed for the isocyanate content and sufficient additional toluene diisocyanate was added and stirred in for 20 minutes. The viscosity of the resulting prepolymer was 14,000 centipoises at 20° C. The prepolymer was allowed to mature for 2 days at room temperature, and then transferred to the jacketted vessel of the foaming apparatus.

*Foaming*

The temperature of the prepolymer was maintained at 25° C. while it was pumped at a constant rate of 1,000 gm. per minute by the gear pump to the mixing chamber of the foaming apparatus with the high speed stirrer in operation. Liquid carbon dioxide was drawn from the supply cylinder, cooled to 0° C.±2° by passing through the cooled metal coil and then pumped at a constant rate of 40 gm. per minute into the prepolymer by the metering injection pump through the atomising nozzle which was set to open at 150 atmospheres. N.N-dimethylbenzylamine was injected into the mixing chamber at a rate of 22 gm. per minute by a separate metering injection pump, and a 4% aqueous solution of N-methyl-morpholine was injected at a rate of 31 gm. per minute, also by a separate pump of the same type.

Pressure in the mixing chamber was maintained constant at 300 lbs. per square inch by manual adjustment of the valve controlling the flow of the emergent mixture. The material expanded on leaving the nozzle to a foam which was allowed to run into an open mould. Setting of the foam took place in approximately 15 minutes and the product was then removed, compressed to one third of its thickness three times by passing through rollers, and finally matured by heating for 30 minutes at 70 to 80° C. The product was a soft resilient foam of good structure, having a density of approximately 0.4 gm./cc.

Having now described my invention, what I claim is:

1. In the process of making a polyurethane foamed material wherein polyurethane forming reactants comprising
   (1) a hydroxy terminated polyalkylene ether glycol having a molecular weight of at least 500
   (2) an organic compound of the class consisting of polyisocyanates and polyisothiocyanates in an amount in excess of that required to react with the hydroxyl end groups of said polyol and
   (3) water, are mixed and reacted to form a cellular polyurethane, the imprvoement which comprises reacting said polyalkylene ether glycol and said organic compound to form a prepolymer with end groups of the formula, —NCX where X is an atom selected from the group of atoms consisting of oxygen and sulphur and having a viscosity of from 10,000 to 30,000 centipoises at 20° C., continuously feeding said prepolymer and said water under pressure into a chamber together with liquefied carbon dioxide as substantially the sole inert added foaming agent in an amount of at least one percent by weight of the prepolymer, said carbon dioxide being under pressure in the liquefied state and at a temperature below that at which substantial reaction between the said prepolymer and the water takes place, stirring the resultant liquid mixture in the chamber, foaming the liquid mixture by releasing it from the chamber and thereby reducing the pressure in the liquid mixture and allowing the temperature of the foamed mixture to rise to convert it into an elastomer before substantial breakdown of the foam takes place.

2. The process of claim 1 in which said liquefied carbon dioxide is atomised into a continuous stream of said prepolymer before said prepolymer is mixed with said cross-linking agent.

3. The process of claim 2 in which the pressure of said mixed prepolymer and liquefied carbon dioxide is above the partial pressure of gas dissolved in the prepolymer at the temperature of the mixture.

4. A process according to claim 1 wherein the liquefied gas is incorporated in the polyalkylene ether glycol prior to addition of water.

5. A process according to claim 1 wherein the prepolymer has a molecular weight of at least 1000.

6. A process according to claim 5 wherein the said molecular weight is at least 3000.

7. A process according to claim 1 wherein the liquefied gas is cooled 15° to 30° centigrade below the temperature of the prepolymer.

References Cited by the Examiner

UNITED STATES PATENTS

| | | | |
|---|---|---|---|
| 2,666,036 | 1/54 | Schwenke | 260—2.5 |
| 2,816,741 | 12/57 | Shuffman | 259—8 |
| 2,829,117 | 4/58 | Lindemann | 260—2.5 |
| 2,868,518 | 1/59 | Corby et al. | 259—8 |
| 2,949,431 | 8/60 | Britain | 260—2.5 |
| 2,955,091 | 10/60 | Kane | 260—2.5 |
| 2,957,832 | 10/60 | Gmitter et al. | 260—2.5 |
| 2,958,516 | 11/60 | Wall et al. | 260—2.5 |
| 2,977,330 | 3/61 | Brower | 260—2.5 |

FOREIGN PATENTS

| | | |
|---|---|---|
| 1,161,239 | 3/58 | France. |
| 559,499 | 3/57 | Italy. |
| 821,342 | 10/59 | Great Britain. |

LEON J. BERCOVITZ, *Primary Examiner.*

D. ARNOLD, *Examiner.*